United States Patent [19]

Helldörfer et al.

[11] Patent Number: 5,344,222
[45] Date of Patent: Sep. 6, 1994

[54] METHOD FOR CONTROLLING A BRAKING OPERATION INCLUDING DETERMINING BRAKE COEFFICIENT FORCES

[75] Inventors: Reinhard Helldörfer, Igelsdorf; Jürgen Leuteritz, Nuremberg; Matthias Gramann, Neunkirchen a. Sand; Bernhard Töpfer, Stuttgart, all of Fed. Rep. of Germany

[73] Assignees: Temic Telefunken microelectronic GmbH, Heilbronn; Mercedes-Benz Aktiengesellschaft, Stuttgart, both of Fed. Rep. of Germany

[21] Appl. No.: 35,782

[22] Filed: Mar. 23, 1993

[30] Foreign Application Priority Data

Mar. 31, 1992 [DE] Fed. Rep. of Germany ....... 4210576

[51] Int. Cl.$^5$ .................... B60T 8/32; G01P 15/02; G01P 3/00; G05D 15/00
[52] U.S. Cl. ...................................... 303/100; 303/91
[58] Field of Search ............... 303/1, 100, 102, 103, 303/111, 104, 105–109, 91, 93; 188/181 A, 181 R; 364/426.01, 426.02, 426.03

[56] References Cited

U.S. PATENT DOCUMENTS 4,489,382 12/1984 Jonner et al. .
4,693,522 9/1987 Wupper et al. .
4,929,035 5/1990 Shimanuki .
4,947,332 8/1990 Ghoneim .
5,123,715 6/1992 Okubo .
5,190,361 3/1993 Onaka et al. .
5,211,452 5/1993 Okazaki et al. .
5,216,608 6/1993 Ito et al. .
5,249,641 10/1993 Sakata .
5,249,848 10/1993 Matsuto et al. .

FOREIGN PATENT DOCUMENTS 3939009 5/1991 Fed. Rep. of Germany .

*Primary Examiner*—Douglas C. Butler
*Attorney, Agent, or Firm*—Spencer, Frank & Schneider

[57] ABSTRACT

A method is described for determining brake coefficients, which define the relationship between the brake pressure and the brake force at a wheel or axle of a motor vehicle or of a section of a vehicle combination during the braking operation of the vehicle or vehicle combination. During the braking operation of vehicle, the wheel speed and the brake pressure are determined measurement/time intervals with differing brake pressure distribution between the wheels, axles or vehicle sections are formed, in which the equilibrium of forces between the brake force and the force of inertia of the motor vehicle is obtained. The mass-related brake coefficients of the brake-pressure-sensed wheels or axles and a mean value for the mass-related brake coefficient of all non-brake-pressure-sensed wheels or axles are determined from the equations for the equilibrium of forces in the measurement/time intervals; by forming the quotient between these mass-related brake coefficients, the relative brake force development of the individual axle (or of the individual section of the vehicle combination), i.e. its respective proportion of the total brake force sum, can be determined without the need to know vehicle-specific design data or the total mass.

17 Claims, 2 Drawing Sheets

METHOD FOR CONTROLLING A BRAKING OPERATION INCLUDING DETERMINING BRAKE COEFFICIENT FORCES

BACKGROUND OF THE INVENTION

During braking of a motor vehicle, each wheel is subjected to a large number of forces—for example the brake force, the dynamic wheel load (vertical forces on the axle during driving), rotatory forces, coupling forces, forces of inertra, etc.

The brake force as the most important of these forces depends in most brake systems on the brake pressure acting in the brake cylinder. The ratio of the brake force achievable in the tire contact area and the brake pressure in the brake cylinders that is, the brake coefficient or brake force development is therefore an informative quantity for checking or controlling the braking operation in these brake systems.

SUMMARY OF THE INVENTION

The object underlying the present invention is to provide a simple, but nevertheless precise method for determining brake coefficients.

This object is attained by a method according to the present invention for controlling a braking operation by determining brake coefficients defining a relationship between brake pressure and brake force at one of a wheel, axle or section of a vehicle during a braking operation. This method determines wheel speed and brake pressure during measurement/time intervals during one or more braking operations with differing brake pressure distributions between the wheels, axles or sections of a vehicle. The equilibrium of forces between the brake force and the force of inertia of the vehicle is formed and the mass-related brake coefficients of the brake-pressure-sensed wheels and a mean value for the mass-related brake coefficients of all non-brake-pressure-sensed wheels are determined based on the equilibrium of forces developed from the measurement/time intrevals.

According to the present invention, the method can be applied with respect to an axle of a vehicle or a section of a vehicle combination, such as a tractor/trailer combination. Preferably, the number of measurement/time intervals is at least as great as the number of brake coefficients to be determined. Further, the measurement/time intervals are formed within a short period of the braking operation. When the wheel speed of at least one wheel of a motor vehicle and the pressure values in the brake cylinders are known, it is possible with the present method and with the assistance of the horizontal equilibrium of forces—which states that the brake force exerted during a braking operation corresponds in a first approximation to Newton's force of inertia—to determine the relationship between the brake coefficients of all brake-pressure-sensed wheels (axles) or the mean value of the brake coefficient for all non-brake-pressure-sensed wheels (axles) of the vehicle. If the brake coefficients are known, further conclusions can be drawn about the brake process so that selective (open-loop or closed-loop control) interventions in the brake process can be made.

Determination of the brake coefficients entails the following procedural steps:

A braking operation is divided into several measurement/time intervals, the number of which is at least as high as, but is preferably selected higher than, the number of brake coefficients to be determined. The duration of the measurement/time intervals is selected such that the total duration of all measurement/time intervals is substantially shorter than the duration of the braking operation. The various measurement/time intervals should be subjected to approximately equal conditions in order to minimize effects of other factors on the determination of the brake coefficients. There are therefore preferably, formed within a short period of the braking operation, for example, immediately after one another, and are, for example, approximately in the middle of the braking operation. As a general principle, it is also possible to use measurement intervals from different braking operations, provided they are comparable with regard to certain influencing parameters (e.g., starting speed).

In each measurement/time interval, the current brake force of the various wheels/axles is equated with the respective force of inertia of the vehicle. Accordingly, horizontal equilibrium of forces is achieved without accounting for negligible factors, such as rolling resistance forces, aerodynamic forces, etc. The quantities required for the equilibrium of forces can be determined: the brake force when the measured brake pressure in the brake cylinders is known (with only the brake coefficient remaining unknown), and the force of inertia based on the total mass when the measured wheel speed(s) is/are known (for example, by sensing the wheel revolution). It is, therefore possible to determine, using equilibrium of force equations of the various measurement/time intervals, the brake coefficients based on the total mass for the individual wheels/axles.

The equations for the equilibrium of forces from each two measurement/time intervals can be subtracted from one another, and as a result, measurement errors can be eliminated and the precision of brake coefficient determination increased.

Furthermore, by obtaining the difference in the equilibrium of force equations, the brake pressure on the brake shoes/drums that is actually effective in the braking operation is correctly taken into account for the pressure needed to determine the brake force, instead of the brake pressure measured in the brake cylinders.

Mass-independent relative values of the brake coefficient values are obtained by setting the brake coefficient of a wheel/axle based on the total mass in proportion to any second brake coefficient of another wheel/axle, and thereby eliminating the mass of the vehicle.

Systematic dependencies on, for example, the speed or deceleration level of the brake coefficients, can be taken into account when determining the brake coefficients by a suitable functional component.

The determined brake coefficients are checked on the basis of certain reasonableness calculations. If they are not within a certain range, for example, an empirically determined one, the value is rejected and a new determination process is implemented.

The method presented combines a number of advantages:

it can be used for all vehicles meeting the conditions stated (brake pressure/wheel speed measurement) in standardized form, it can be applied simply and without extensive equipment and hence, inexpensively, when the brake coefficients are known (they are informative for many open-loop/closed-loop control processes), further data can be obtained about the brake process.

the brake pressure can be selectively controlled, and the braking operation thereby optimized or made safer.

Description of a Preferred Embodiment

Figure 1:
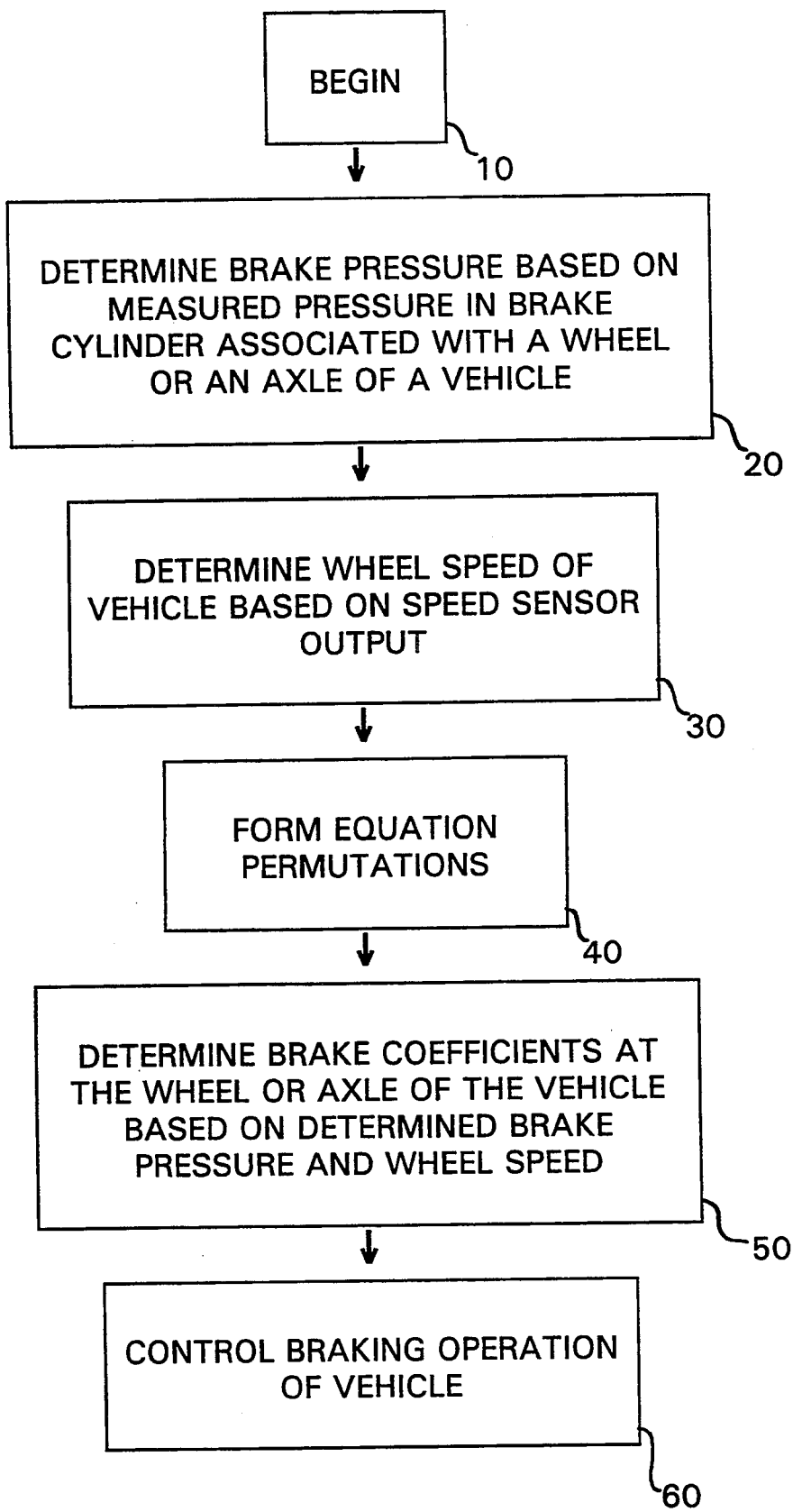
FIG. 1 is a flow diagram showing a preferred embodiment of the present invention for determining a brake coefficient associated with a wheel of a vehicle.

A method for determining the brake coefficients and a possible application are set forth in the following on the basis of an embodiment, in which the improvement of the braking operation is described in a truck combination comprising a twin-axle tractor vehicle having brake pressure sensors for each axle and a twin-axle trailer with a given brake pressure in the control line.

In coupled systems of this type, that is, the combination of tractor and trailer the following problems are encountered during the braking operation: since the brake force is usually variously distributed, the axles of the trailer are usually very sensitive to overbraking and must, therefore, be controlled with a reduced brake pressure. In addition, considerable longitudinal forces that impair safety occur between the individual vehicles if the quotients from the brake force and the dynamic wheel load fixed by the vehicle at the individual wheels or axles differ in magnitude.

For optimum deceleration of the trailer or for minimization of the longitudinal forces, the brake force must be correspondingly regulated using the brake pressure. For this purpose the brake coefficient must be known. The brake coefficients have, for example, to be determined for the two axles of the tractor and for the trailer. To do so, the brake force of the tractor axles or of the trailer and the force of inertia of the truck/trailer combination must be determined during at least three measurement/time intervals $t_i$ with a different brake pressure distribution in each case:

The brake force $F_B$ effective during the braking operation per axle of the tractor or as a mean value for the trailer is given by:

$$F_B = BKW_A \cdot p_A \quad (1)$$

where, $BKW_A$ is the respective brake coefficient for each axle, $p_A$ the respective effective brake pressure of the axles A in question, and A is the particular axle under consideration. In the case of the axle of the trailer, the "center" axle of the trailer is considered.

Newton's force of inertia $F_T$ during the braking operation can be expressed as follows:

$$F_T = m \cdot z \quad (2)$$

where, m is the total mass of a vehicle, or in this case, the combination of the tractor and trailer, and z is the brake deceleration (negative acceleration) of the vehicle or combination.

By formation of the equilibrium of forces $\Sigma F_B = F_T$, the result of the sum of the three axles A considered from equation (1) and (2) is as follows:

$$\Sigma(BKW_A \cdot p_A) = m \cdot z \quad (3)$$

each of the measurement/time intervals $t_i$ (for example with a duration of approx. 10–100 ms) provides in accordance with equation (3), for each of the 3 axles A, an equation $\Sigma F_B = F_T$, which contains the 3 unknown coefficients $BKW_A$ (in the form of equation (3)).

During the measurement/time intervals $t_i$, the brake pressure in the brake cylinders of the axles A is sensed for the required pressure value $p_A$ and the respective brake deceleration z determined with the aid of a wheel speed measurement, for example.

Figure 2:
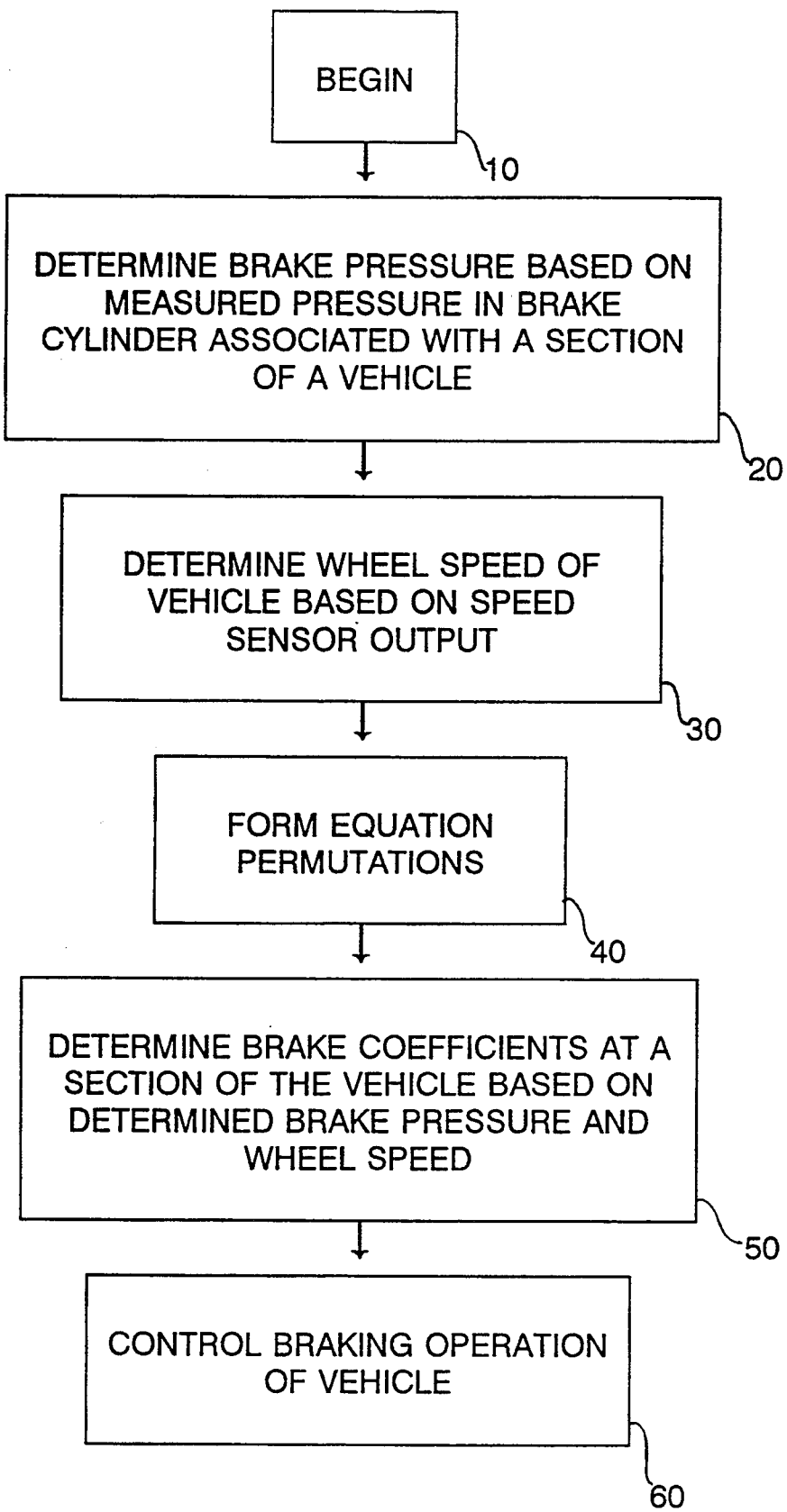
FIG. 2 is a flow diagram showing a preferred embodiment of the present invention for determining a brake coefficient associated with an axle of a sectional vehicle.

FIGS. 1 and 2 show flow diagrams for diagrams for determining a brake coefficient associated with a wheel of a vehicle and with an axle of a sectional vehicle, respectively. Both flow diagrams according to the present invention are similar so they will be described together. Steps 10, 20 and 30 in FIGS. 1 and 2 show a typical processing flow for obtaining the quantities required for determining the equilibrium of forces, that is, determining the brake pressure in the brake cylinders and wheel speeds for the brake coefficients to be determined. The process is entered at step 10 and the determination of brake pressure occurs at step 20. In FIG. 1, brake pressure is determine for a wheel of a vehicle. In FIG. 2, brake pressure is determine for an axle of a sectional vehicle. At step 30, wheel speed is determined based on a speed sensor output. In the present invention example, four time intervals $t_1$–$t_4$ (i=4) are evaluated during the braking operation, for example, and hence 4 equations (3) are formed. By evaluating these equations, the (mass-dependent) quotients $BKW_A/m$ for the stated axles A of the combination are determined.

The equations (3) for the equilibrium of forces from two different time intervals $t_i$ are each subtracted from one another at step 40. On the one hand, this increases the number of evaluatable equations, for example, from 4 equations to 6 equations in the case of 4 measurement/time intervals $t_1$–$t_4$. On the other hand, the brake pressure measured or sensed in the brake cylinders is converted into the effective brake pressure required in equation (3) at step 50. (The following applies: effective brake pressure = measured brake pressure − application pressure)

The speed dependence and/or the acceleration dependence of the brake coefficient is taken into account by a suitable component in the equations (3), for example by the incorporation of a linear dependence of the brake coefficient.

If the ratio of the brake coefficients $BKW_A$ determined using equation (3) is formed at two different axles, for example, from the front axle to the rear axle of the tractor vehicle, the (usually unknown) total mass m of the combination is dispensed with.

The brake process of the combination can be subjected to defined open-loop or closed-loop control with the aid of the determined brake coefficients at step 60 by selective presetting of the brake pressure, and hence the braking operation optimized; furthermore, longitudinal forces can be minimized or at least reduced. Step 50 of FIG. 1 shows that a braking operation of a vehicle is controlled, while FIG. 2 shows that a braking operation of a sectional vehicle is controlled.

What is claimed is:

1. A method for controlling a braking operation of a vehicle using a brake coefficient for defining a relationship between brake pressure and brake force associated with one of a wheel and an axle of a vehicle and a section of a vehicle combination during the braking operation of the vehicle, the method comprising the steps of:

determining a brake pressure associated with the wheel or axle of the vehicle or the section of the vehicle combination during at least one measurement interval during the braking operation;

determining a speed associated with at least one wheel of the vehicle during the braking operation during the at least one measurement interval;

determining a force of inertia associated with the wheel or axle of the vehicle or the section of the vehicle combination based on the determined speed;

determining a mass-related brake coefficient associated with the brake-pressure-sensed wheel, axle or section of the vehicle based on the determined force of inertia and the determined brake pressure;

determining a mean value for a mass-related brake coefficient associated with any non-brake-pressure-sensed wheel, axle or section of the vehicle; and controlling the braking operation of the vehicle based on the determined mass-related brake coefficient associated with the brake-pressure sensed wheel, axle or section of the vehicle and the mean value for a mass-related brake coefficient associated with the non-brake-pressure-sensed wheel or axle of the vehicle or section of the vehicle combination.

2. The method according to claim 1, wherein the step of determining a brake pressure occurs during a plurality of braking operations wherein each braking operation of the plurality of braking operations has a different brake pressure distribution.

3. The method according to claim 2, wherein the at least one measurement interval occurs within a short period of the braking operation.

4. The method according to claim 2, wherein the plurality of measurement intervals immediately follow each other.

5. The method according to claim 2, wherein the plurality of measurement intervals occurs during a plurality of braking operations, each of the plurality of braking operations being comparable with each other with respect to a predetermined parameter.

6. The method according to claim 1, wherein the at least one measurement interval is a plurality of measurement intervals equal to or greater than a number of mass-related brake coefficients determined.

7. The method according to claim 1, wherein a total duration of the at least one measurement interval is substantially shorter that a duration of the braking operation.

8. The method according to claim 1, further comprising the steps of forming a ratio of two mass-related brake coefficients of the wheel or axle of the vehicle or the section of the vehicle combination, and determining mass-independent brake coefficient relative values based on the ratio.

9. The method according to claim 1, wherein each determined brake pressure and determined wheel speed associated with a wheel or axle of the vehicle or the section of the vehicle combination is set in proportion to other determined brake pressures and determined wheel speeds associated with other wheels and axles of the vehicles or other sections of the vehicle combination, respectively.

10. The method according to claim 9, further comprising the step of forming an effective brake pressure associated with each wheel or axle of the vehicle or the section of the vehicle combination, the effective brake pressure being based on the determined brake pressure associated with the wheel or axle of the vehicle or the section of the vehicle combination, respectively, and wherein the step of determining a mass-related brake coefficient associated with the wheel or axle of the vehicle or the section of the vehicle combination is based on the determined force of inertia for the vehicle and the effective brake pressure associated with the wheel or axle of the vehicle or the section of the vehicle combination, respectively.

11. The method according to claim 10, wherein the step of determining a mass-related brake coefficient associated with each wheel or axle of the vehicle or each section of the vehicle combination is further based on a speed dependence of the mass-related brake coefficient.

12. The method according to claim 9, wherein the step of determining a mass-related brake coefficient associated with each wheel or axle of the vehicle or each section of the vehicle combination is further based on a deceleration dependence of the mass-related brake coefficient.

13. The method according to claim 1, wherein the determined wheel speed is based on an output of a speed sensor, and a deceleration for determining the force of inertia is determined based on the determined wheel speed.

14. The method according to claim 1, wherein the determined wheel speed is based on an output of a speed sensor.

15. The method according to claim 1, wherein the step of determining a mass-related brake coefficient determines a mass-related brake coefficient for a compressed air brake system.

16. The method according to claim 1, wherein the step of determining a mass-related brake coefficient determines a mass-related brake coefficient for an electro-pneumatic brake system.

17. The method according to claim 1, wherein the step of controlling the braking operation controls the braking operation of a tractor-trailer combination.

* * * * *